Patented Aug. 31, 1926.                                     1,598,474

UNITED STATES PATENT OFFICE.

CHARLES E. BURKE AND RICHARD L. KRAMER, OF WILMINGTON, DELAWARE, ASSIGNORS TO E. I. DU PONT DE NEMOURS & COMPANY, OF WILMINGTON, DELAWARE, A CORPORATION OF DELAWARE.

NITRATED ESTER.

No Drawing.    Application filed September 13, 1924.    Serial No. 738,548.

This invention relates to new compositions of matter, and comprises nitrated esters of lactic acid and mono-hydric alcohols having more than three carbon atoms, and particularly from four to six carbon atoms. These new nitrated esters are characterized by their comparatively low volatility.

The new compounds have in general the following graphical formula:—

$$CH_3-\underset{H}{\overset{O.NO_2}{C}}-COOR$$

where R represents the radical of a mono-hydric alcohol having more than three carbon atoms, as, for example, butyl, amyl, hexyl, and cyclo-hexyl alcohols.

Compounds such as those described may be prepared as follows:—The ester of lactic acid and the alcohol is first prepared by any of the well known methods described in the literature as by bringing together lactic acid and the alcohol in the presence of an esterfying agent such as sulfuric acid. The ester so prepared is then added gradually and with vigorous agitation to a mixed acid consisting of approximately equal parts of sulfuric and nitric acid, the temperature during this addition being maintained at approximately 15° C. When the reaction is complete and the agitation is stopped the mixture separates into two distinct layers, and the upper layer, which constitutes the desired product, is separated, washed to neutrality and dried.

We have discovered that compounds of this type are practically insoluble in water and acids such as the mixed acid and spent acid used in the nitration; are soluble in organic solvents; are good colloiding agents for nitrocellulose; and are of such low volatility that when colloided with nitrocellulose they may be retained in the mixture without difficulty.

Compounds of this type are of particular value since, being colloiding agents for nitrocellulose, they can be intimately and uniformly mixed with this ingredient; being nonhygroscopic, they lower the hygroscopicity of their mixtures with nitrocellulose; being of low volatility they are readily retained in the mixtures; and, moreover, since the compounds are nitric esters they can be used, for example, in explosives in considerable quantities without lowering the potential of the explosive to the same degree that non-nitrogen containing compounds would.

We claim:

1. A product comprising a compound obtainable by causing a mixture of nitric and sulfuric acids to act on a lactic acid ester of a mono-hydric alcohol containing more than three carbon atoms, said compound being a colloiding agent for nitro-cellulose.

2. As a new compound, a nitrated lactic acid ester of a mono-hydric alcohol having most probably the following general formula:—

$$CH_3-\underset{H}{\overset{O.NO_2}{C}}-COOR$$

where R represents the radical of a mono-hydric alcohol having more than three carbon atoms.

3. A compound as defined in claim 2 in which R represents the radical of a mono-hydric alcohol containing from 4 to 6 carbon atoms.

4. A compound as defined in claim 2 which is further characterized by being insoluble in water, but soluble in ether, acetone, and other common organic solvents.

5. A compound obtainable by the action of a mixture of nitric and sulfuric acids on the lactic acid ester of normal butyl alcohol.

6. Normal-butyl nitro-lactate having the formula: $CH_3.CH(O.NO_2).COOC_4H_9$.

In testimony whereof we affix our signatures.

CHARLES E. BURKE.
RICHARD L. KRAMER.